US012803775B2

(12) United States Patent
Nakanishi et al.

(10) Patent No.: US 12,803,775 B2
(45) Date of Patent: Nov. 17, 2026

(54) TIME SYNCHRONIZATION DEVICE, TIME SYNCHRONIZATION METHOD, AND PROGRAM

(71) Applicant: NTT, Inc.

(72) Inventors: Takashi Nakanishi, Tokyo (JP); Go Yazawa, Tokyo (JP); Keisuke Yamagata, Tokyo (JP); Shinichi Yoshihara, Tokyo (JP)

(73) Assignee: NTT, Inc., Tokyo (JP)

( * ) Notice: Subject to any disclaimer, the term of this patent is extended or adjusted under 35 U.S.C. 154(b) by 338 days.

(21) Appl. No.: 18/567,336

(22) PCT Filed: Jun. 8, 2021

(86) PCT No.: PCT/JP2021/021791

§ 371 (c)(1),
(2) Date: Dec. 5, 2023

(87) PCT Pub. No.: WO2022/259381

PCT Pub. Date: Dec. 15, 2022

(65) Prior Publication Data

US 2025/0119269 A1 Apr. 10, 2025

(51) Int. Cl.
*H04L 7/00* (2006.01)

(52) U.S. Cl.
CPC .................................. *H04L 7/0016* (2013.01)

(58) Field of Classification Search
CPC ...... H04L 7/0016; H04J 3/0641; H04J 3/0667
See application file for complete search history.

(56) References Cited

U.S. PATENT DOCUMENTS

2002/0167920 A1* 11/2002 Miyazaki .............. H04W 28/02 370/282
2005/0185744 A1* 8/2005 Sato ..................... H04B 1/7117 342/104
2009/0016475 A1* 1/2009 Rischar ................. H04J 3/0697 375/356

(Continued)

FOREIGN PATENT DOCUMENTS

JP 2016502790 A 1/2016

OTHER PUBLICATIONS

IEEE Instrumentation and Measurement Society (2019) "IEEE Standard for a Precision Clock Synchronization Protocol for Networked Measurement and Control Systems" IEEE Std 1588™-2019 (Revision of IEEE Std 1588-2008), Jun. 16, 2020.

*Primary Examiner* — Kiet Tang

(57) ABSTRACT

A time synchronization device (10) according to the present disclosure includes: a selection unit (16) that selects one master device (1) that performs time synchronization from among a plurality of master devices (1); a correction value calculation unit (17) that calculates a time correction value for correcting an internal time such that the one master device (1) and the time synchronization device synchronize with each other; a correction value storage unit (18) that stores a previous time correction value used for correcting the internal time; and a correction value adjustment unit (19) that, in a case where the one master device (1) is switched, adjusts a time correction value calculated for a switching destination master device (1) on the basis of the stored time correction value and corrects the internal time on the basis of the adjusted time correction value.

20 Claims, 8 Drawing Sheets

(56) References Cited

U.S. PATENT DOCUMENTS

| | | | | |
|---|---|---|---|---|
| 2011/0170534 | A1 * | 7/2011 | York | H04J 3/0667 702/89 |
| 2015/0113186 | A1 * | 4/2015 | Chandra | G06F 13/423 710/106 |
| 2016/0197719 | A1 * | 7/2016 | Wang | H04J 3/0641 709/248 |

* cited by examiner

TIME SYNCHRONIZATION DEVICE, TIME SYNCHRONIZATION METHOD, AND PROGRAM

CROSS-REFERENCE TO RELATED APPLICATIONS

This application is a U.S. 371 Application of International Patent Application No. PCT/JP2021/021791, filed on 8 Jun. 2021, the disclosure of which is hereby incorporated herein by reference in its entirety.

TECHNICAL FIELD

The present disclosure relates to a time synchronization device, a time synchronization method, and a program.

BACKGROUND ART

A method of synchronizing times of devices on a network is, for example, a method using the Network Time Protocol (NTP) or IEEE 1588. In particular, the Precision Time Protocol (PTP), which is a time synchronization protocol, is used to synchronize time with accuracy of microseconds or less (Non Patent Literature 1).

A method of synchronizing time by using the PTP in a system in which a device that distributes time (hereinafter, referred to as "master device") and a device to be synchronized with the time distributed from the master device (hereinafter, referred to as "slave device") are connected will be described with reference to FIG. 5.

The master device transmits a Sync signal to the slave device. The master device notifies the slave device of a transmission time t1 of the Sync signal by using the Sync signal. Upon receiving the Sync signal, the slave device stores a reception time t2 of the Sync signal. Then, the slave device transmits a Delay Req signal to the master device. The slave device stores a transmission time t3 of the Delay Req signal.

Upon receiving the Delay Req signal, the master device stores a reception time t4 of the Delay Req signal. Then, the master device transmits a Delay Resp signal to the slave device. The master device notifies the slave device of the reception time t4 of the Delay Req signal by using the Delay Resp signal. By transmitting and receiving the above time synchronization signals (Sync signal, Delay Req signal, and Delay Resp signal), the slave device can acquire information regarding the times t1 to t4.

Assuming that a round-trip delay between the master device and the slave device is equal, a time difference Δt between the master device and the slave device is shown by Expression 1 below. The slave device adjusts an internal time such that Δt=0 holds. This achieves time synchronization between the master device and the slave device.

$$\Delta t=((t2-t1)-(t4-t3))/2 \qquad \text{Expression 1}$$

CITATION LIST

Non Patent Literature

Non Patent Literature 1: IEEE Std 1588?-2019 "IEEE Standard for a Precision Clock Synchronization Protocol for Networked Measurement and Control Systems"

SUMMARY OF INVENTION

Technical Problem

As illustrated in FIG. 6, a time synchronization device that synchronizes time with another device is, for example, a boundary clock (BC) device 10 that operates as a slave for a master device 1 connected as a host device, operates as a master for a slave device 2 connected as a subordinate device, and synchronizes time with the slave device 2 serving as the subordinate device on the basis of time information distributed from the master device 1 serving as the host device.

The PTP has a redundancy scheme in which the BC device is connected to a plurality of master devices 1 in preparation for a case where one master device cannot transmit correct time information for some reason, and, in a case where an abnormality of one master device 1 performing time synchronization is detected, the BC device synchronizes time with another master device 1. Non Patent Literature 1 also defines the Best Master Clock Algorithm (BMCA) that is an algorithm compatible with such a redundancy scheme.

FIG. 7 illustrates a configuration example of a conventional BC device 10*a* compatible with the redundancy scheme.

As illustrated in FIG. 7, the conventional BC device 10*a* includes a timer 11, a transmitter 12, a frequency adjustment unit 13*a*, an interface (IF) 14, a plurality of IFs 15, a selection unit 16, and a correction value calculation unit 17*a*.

The timer 11 manages an internal time in the BC device 10*a* and outputs time information to the frequency adjustment unit 13*a*.

The transmitter 12 outputs a timing at which the timer 11 clocks time.

The frequency adjustment unit 13*a* adjusts a frequency of transmitting and receiving the time information between the BC device 10*a* and the slave device 2 (a frequency of transmitting and receiving time synchronization signals described with reference to FIG. 5).

The IF 14 is connected to the slave device 2 serving as the subordinate device and transmits and receives the time synchronization signals or the like to and from the slave device 2.

The IFs 15 are connected to the master devices 1 serving as the host device and transmit and receive the time synchronization signals or the like to and from the master device 1. The plurality of master devices 1 (master devices 1-1 and 1-2) are connected to the BC device 10*a*, and the IFs 15-1 and 15-2 are connected to the master devices 1-1 and 1-2, respectively.

Based on the time synchronization signals received from the master devices 1-1 and 1-2 via the IFs 15-1 and 15-2, the selection unit 16 selects a main master device 1 (one master device 1 that synchronizes time with the BC device 10*a*) among from the plurality of master devices 1-1 and 1-2.

Based on time information from the master device 1 selected by the selection unit 16, the correction value calculation unit 17*a* calculates a time correction value that is a correction value for correcting the internal time managed by the timer 11 such that the selected master device 1 and the BC device 10 synchronize with each other. The correction value calculation unit 17*a* corrects the internal time on the basis of the calculated time correction value.

In a case where, for some reason, the BC device 10*a* in FIG. 7 cannot receive a normal time synchronization signal from the master device 1 performing time synchronization, the selection unit 16 selects another master device 1 connected to the BC device 10*a* as the master device 1 that newly performs time synchronization with the BC device 10*a*.

FIG. 8 illustrates an example of an operation of a conventional BC device 10*a*. In FIG. 8, the horizontal axis represents time. Each interval T between times t−2, t−1, t0, t1, t2, and t3 is a period of transmitting and receiving a time synchronization signal between the BC device 10*a* and the slave device 2. Hereinafter, the master device 1 that synchronizes time with the BC device 10*a* is switched between the time to and the time t1. That is, the master device 1 that synchronizes time with the BC device 10*a* is changed from a switching source master device 1 to a switching destination master device 1.

In FIG. 8, the vertical axis represents the time correction value. Hereinafter, the time correction values for the switching source master device 1 at the times t−2, t−1, and to are represented by A-2, A-1, and A 0, respectively, and the time correction values for the switching destination master device 1 at the times t1, t2, and t3 are represented by a1, a2, and a3, respectively.

As illustrated in FIG. 8, when the master device 1 that synchronizes time with the BC device 10*a* is switched between the time to and the time t1, the time correction value used for correcting the internal time of the BC device 10*a* changes from the time correction value A0 (the time correction value for the switching source master device 1) at the time t0 to the time correction value a1 (the time correction value for the switching destination master device 1) at the time t1. Here, in a case where a difference between the time correction value A0 and the time correction value a1 is large, the time correction value suddenly changes. When the time correction value suddenly changes, the internal time of the BC device 10*a* greatly varies, and a time synchronization signal having a large time variation is transmitted to the slave device 2 at the time t1. The slave device 2 may erroneously recognize that abnormality occurs due to the reception of the time synchronization signal having the large time variation. This may affect service provision by the slave device 2.

An object of the present disclosure made in view of the above problems is to provide a time synchronization device, a time synchronization method, and a program capable of suppressing a sudden change in a time correction value caused by switching of a host device that performs time synchronization and reducing an influence on an operation of a subordinate device.

Solution to Problem

In order to solve the above problem, a time synchronization device according to the present disclosure is a time synchronization device that synchronizes an internal time with a time distributed from one host device among a plurality of host devices and synchronizes a subordinate device with the internal time, the time synchronization device including: a selection unit that selects the one host device from among the plurality of host devices; a correction value calculation unit that calculates a time correction value that is a correction value for correcting the internal time such that the one host device and the time synchronization device synchronize with each other; a correction value storage unit that stores a previous time correction value used for correcting the internal time; and a correction value adjustment unit that, in a case where the one host device is switched, adjusts a time correction value calculated for a switching destination host device on the basis of the time correction value stored in the correction value storage unit and corrects the internal time on the basis of the adjusted time correction value.

In order to solve the above problem, a time synchronization method according to the present disclosure is a time synchronization method of synchronizing an internal time with a time distributed from one host device among a plurality of host devices and synchronizing the internal time with a subordinate device, the time synchronization method including: a step of selecting the one host device from among the plurality of host devices; a step of calculating a time correction value that is a correction value for correcting the internal time such that the one host device and the time synchronization device synchronize with each other; a step of storing a previous time correction value used for correcting the internal time; and a step of, in a case where the one host device is switched, adjusting a time correction value calculated for a switching destination host device on the basis of the stored time correction value and correcting the internal time on the basis of the adjusted time correction value.

Further, in order to solve the above problems, a program according to the present disclosure causes a computer to operate as the above time synchronization device.

Advantageous Effects of Invention

A time synchronization device, a time synchronization method, and a program according to the present disclosure can suppress a sudden change in a time correction value caused by switching of a host device that performs time synchronization and reduce an influence on an operation of a subordinate device.

DESCRIPTION OF EMBODIMENTS

Hereinafter, embodiments of the present disclosure will be described with reference to the drawings.

Figure 1:
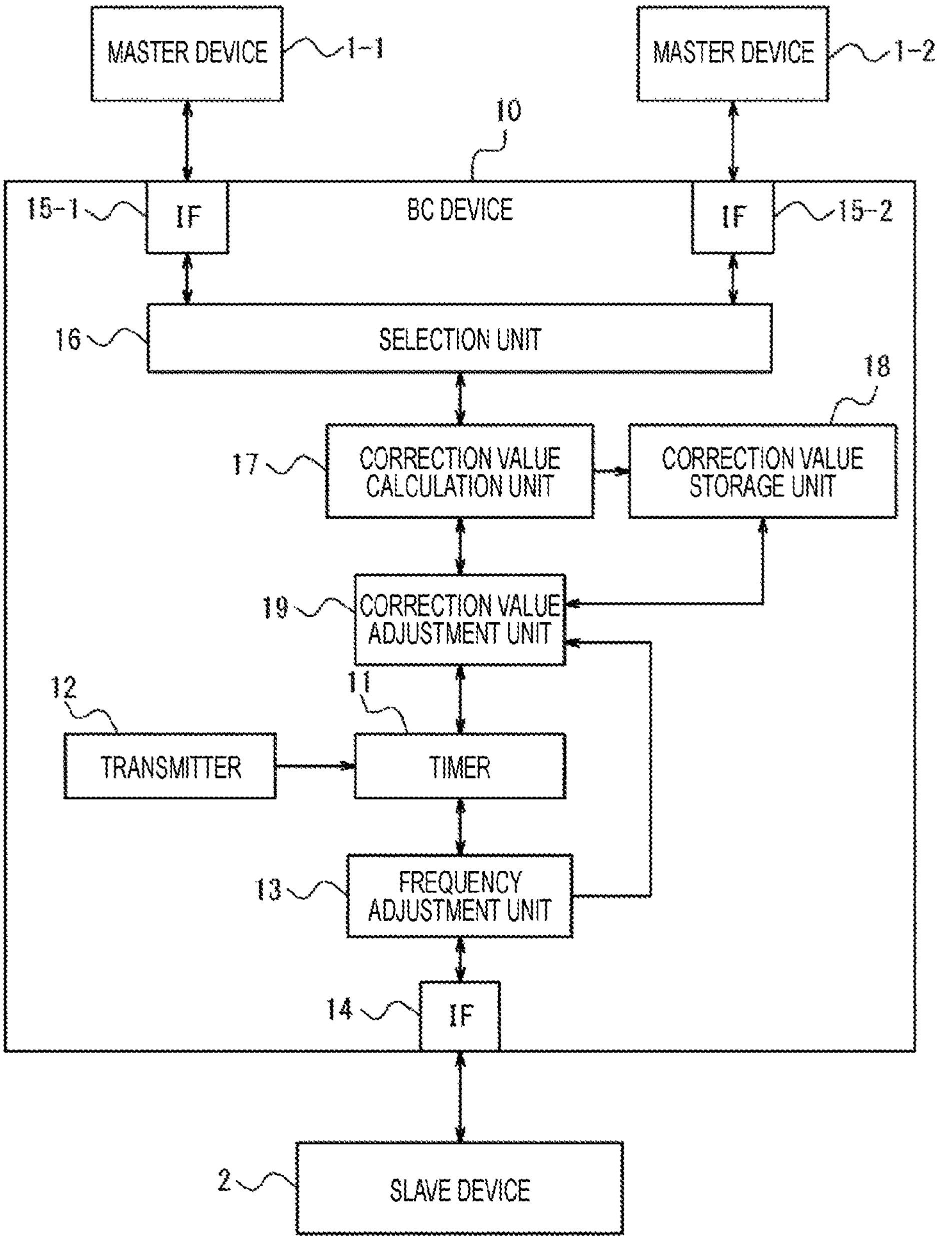
FIG. 1 illustrates a configuration example of a BC device according to an embodiment of the present disclosure.
Figure 6:
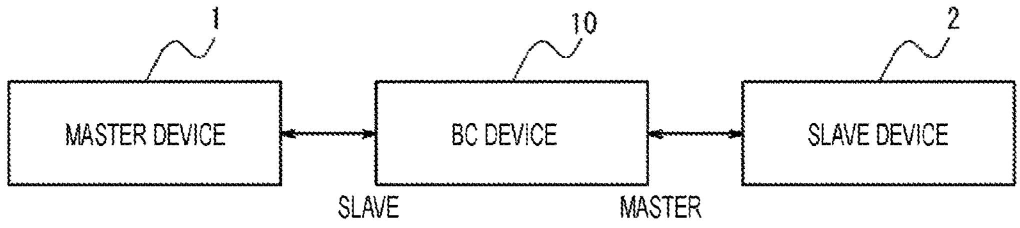
FIG. 6 is an explanatory diagram of a BC device.
Figure 7:
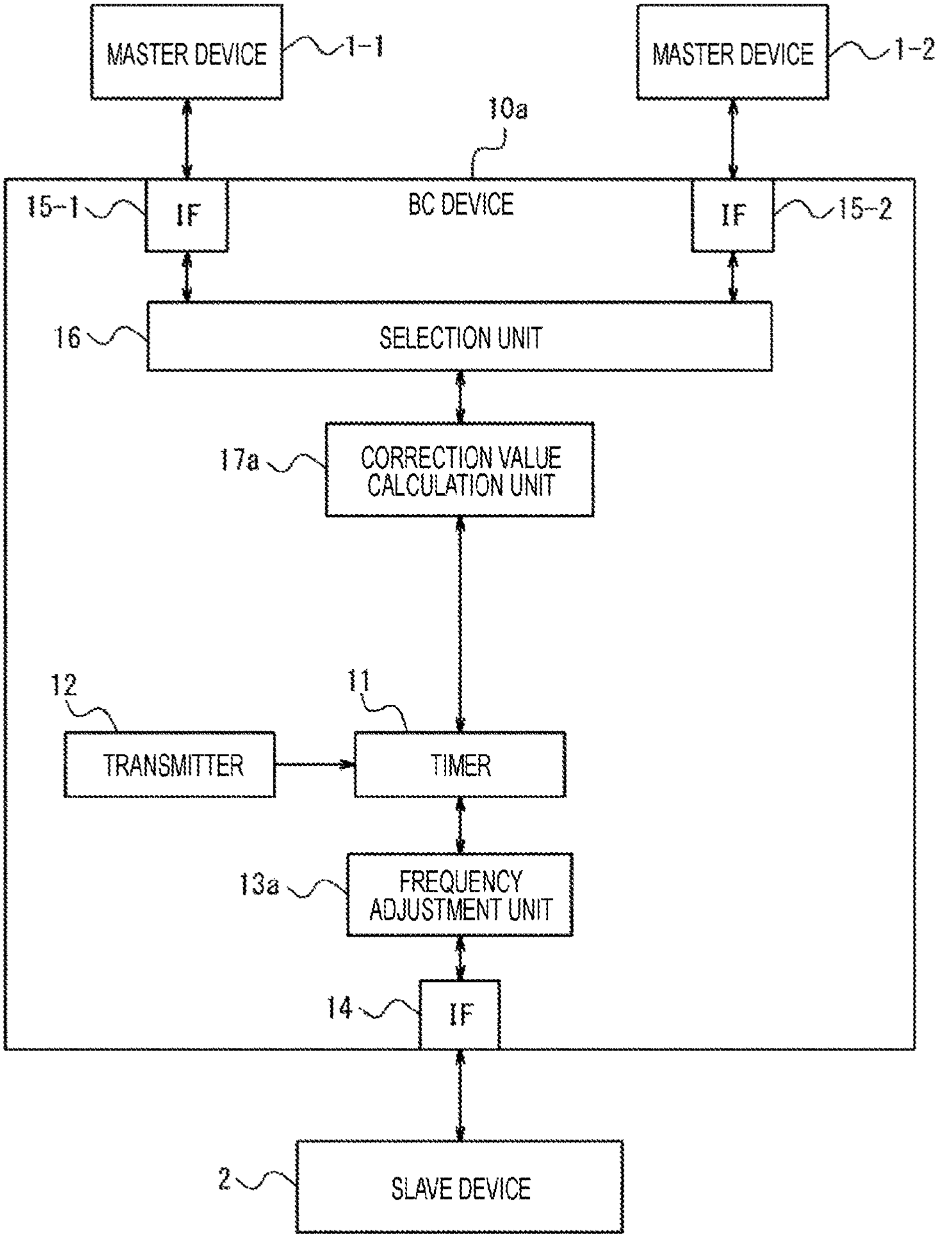
FIG. 7 illustrates a configuration example of a conventional BC device.

FIG. 1 illustrates a configuration example of a BC device 10 according to an embodiment of the present disclosure. As illustrated in FIG. 6, the BC device 10 according to the present disclosure operates as a slave for a master device 1 serving as a host device and operates as a master for a slave device 2 serving as a subordinate device. The BC device 10 according to the present embodiment is connected to a plurality of master devices 1 and synchronizes an internal time with a time distributed from one of the plurality of master devices 1. Therefore, the BC device 10 according to the present disclosure is a time synchronization device that synchronizes the internal time with the time distributed from one of the plurality of host devices (master devices 1) and synchronizes the subordinate device (slave device 2) with the internal time. In FIG. 1, configurations similar to those of FIG. 7 will be represented by the same reference signs, and description thereof will be omitted.

As illustrated in FIG. 1, the BC device 10 according to the present embodiment includes a timer 11, a transmitter 12, a frequency adjustment unit 13, an IF 14, a plurality of IFs 15, a selection unit 16, a correction value calculation unit 17, a correction value storage unit 18, and a correction value adjustment unit 19. The BC device 10 in FIG. 1 is different from the BC device 10*a* in FIG. 7 in that the frequency adjustment unit 13*a* and the correction value calculation unit 17*a* are changed to the frequency adjustment unit 13 and the correction value calculation unit 17, respectively, and that the correction value storage unit 18 and the correction value adjustment unit 19 are added.

Based on time information from the master device 1 selected by the selection unit 16, the correction value calculation unit 17 calculates a time correction value that is a correction value for correcting the internal time managed by the timer 11 such that the selected master device 1 (one host device) and the BC device 10 synchronize with each other. The correction value calculation unit 17 outputs the calculated time correction value to the correction value storage unit 18 and the correction value adjustment unit 19.

The correction value storage unit 18 stores a previous time correction value output from the correction value calculation unit 17 or the correction value adjustment unit 19 and used for adjusting the internal time of the BC device 10.

The frequency adjustment unit 13 adjusts a frequency of transmitting the time information based on the internal time to the slave device 2 serving as the subordinate device and transmits the time information to the slave device 2 via the IF 14 at the adjusted frequency. Further, the frequency adjustment unit 13 outputs the frequency of transmitting the time information to the slave device 2 to the correction value adjustment unit 19.

In a case where the master device 1 (one host device) that synchronizes time with the BC device 10 is switched, the correction value adjustment unit 19 adjusts a time correction value calculated by the correction value calculation unit 17 for the switching destination master device 1 on the basis of the time correction value stored in the correction value storage unit 18. Then, the correction value adjustment unit 19 corrects the internal time managed by the timer 11 on the basis of the adjusted time correction value. The correction value adjustment unit 19 adjusts the time correction value in a period in which the time information is transmitted to the slave device 2, the period being adjusted by the frequency adjustment unit 13. The correction value adjustment unit 19 stores the adjusted correction value in the correction value storage unit 18. Note that, in a case where the master device 1 that synchronizes time with the BC device 10 is not switched, the correction value adjustment unit 19 does not adjust the time correction value and corrects the internal time on the basis of the time correction value calculated by the correction value calculation unit 17.

Next, an operation of the BC device 10 according to the present embodiment will be described.

Figure 2:
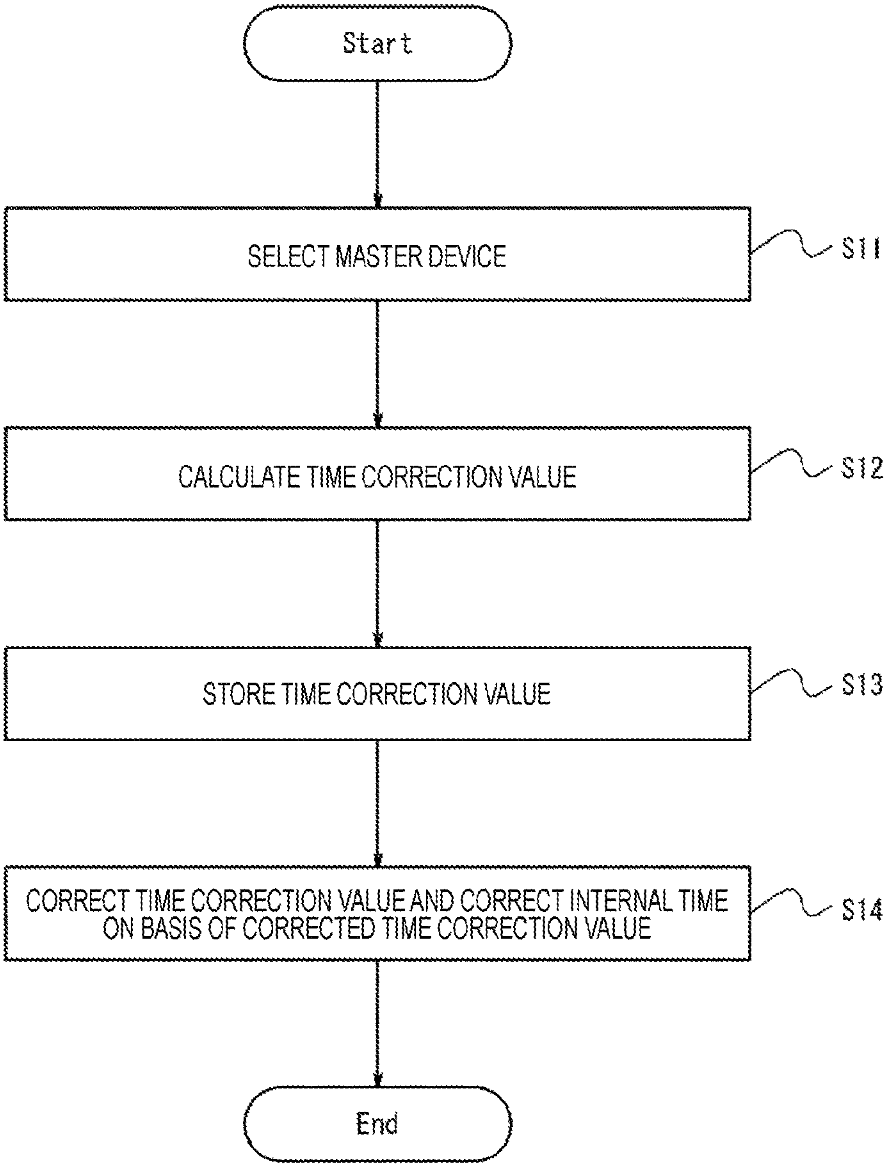
FIG. 2 is a flowchart showing an example of an operation of the BC device in FIG. 1.

FIG. 2 is a flowchart showing an example of the operation of the BC device 10 according to the present embodiment and is an explanatory diagram of a time synchronization method by the BC device 10.

When the BC device 10 detects abnormality or the like in the master device 1 that synchronizes time with the BC device 10, the selection unit 16 selects one master device 1 (switching destination master device 1) that newly performs time synchronization from among the plurality of master devices 1 (step S11). Immediately before the master device 1 that performs time synchronization is switched, the correction value storage unit 18 stores a time correction value for the switching source master device 1.

The correction value calculation unit 17 calculates a time correction value for the master device 1 selected as the switching destination by the selection unit 16 (step S12).

The correction value storage unit 18 stores the time correction value used for correcting the internal time of the BC device 10 (step S13). In a case where the master device 1 performing time synchronization is not switched, the correction value storage unit 18 stores the time correction value calculated by the correction value calculation unit 17. In a case where the correction value adjustment unit 19 adjusts the time correction value in accordance with the switching of the master device 1 performing time synchronization, the correction value storage unit 18 stores the adjusted time correction value. Therefore, in a state in which the master device 1 that performs time synchronization is newly selected, the time correction value for the master device 1 selected as the switching destination is not yet used for correcting the internal time. Thus, the correction value storage unit 18 continues to store the time correction value for the switching source master device 1.

In a case where the master device 1 (one host device) that synchronizes time with the BC device 10 is switched, the correction value adjustment unit 19 adjusts the time correction value calculated for the switching destination master device 1 by the correction value calculation unit 17 on the basis of the time correction value stored in the correction value storage unit 18 (in a state before the switching, the time correction value for the switching source master device 1). The correction value adjustment unit 19 corrects the internal time managed by the timer 11 on the basis of the adjusted time correction value (step S14). Because the internal time is corrected based on the adjusted time correction value, the correction value adjustment unit 19 stores the adjusted time correction value in the correction value storage unit 18. The correction value adjustment unit 19 adjusts the time correction value in a period in which the time information is transmitted to the slave device 2, the period being adjusted by the frequency adjustment unit 13.

Figure 3:
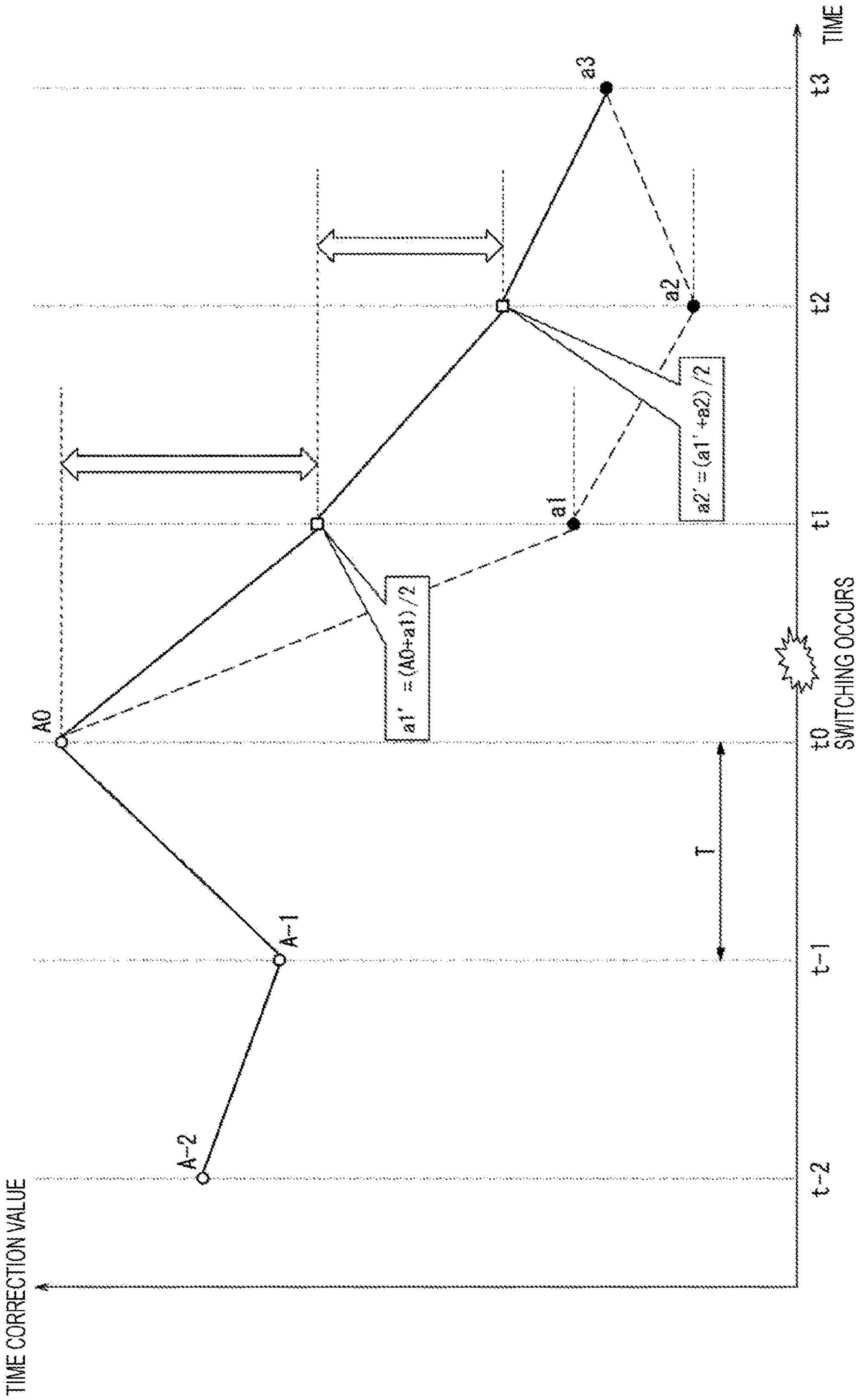
FIG. 3 is an explanatory diagram of adjustment of a time correction value using a correction value adjustment unit in FIG. 1.
Figure 8:
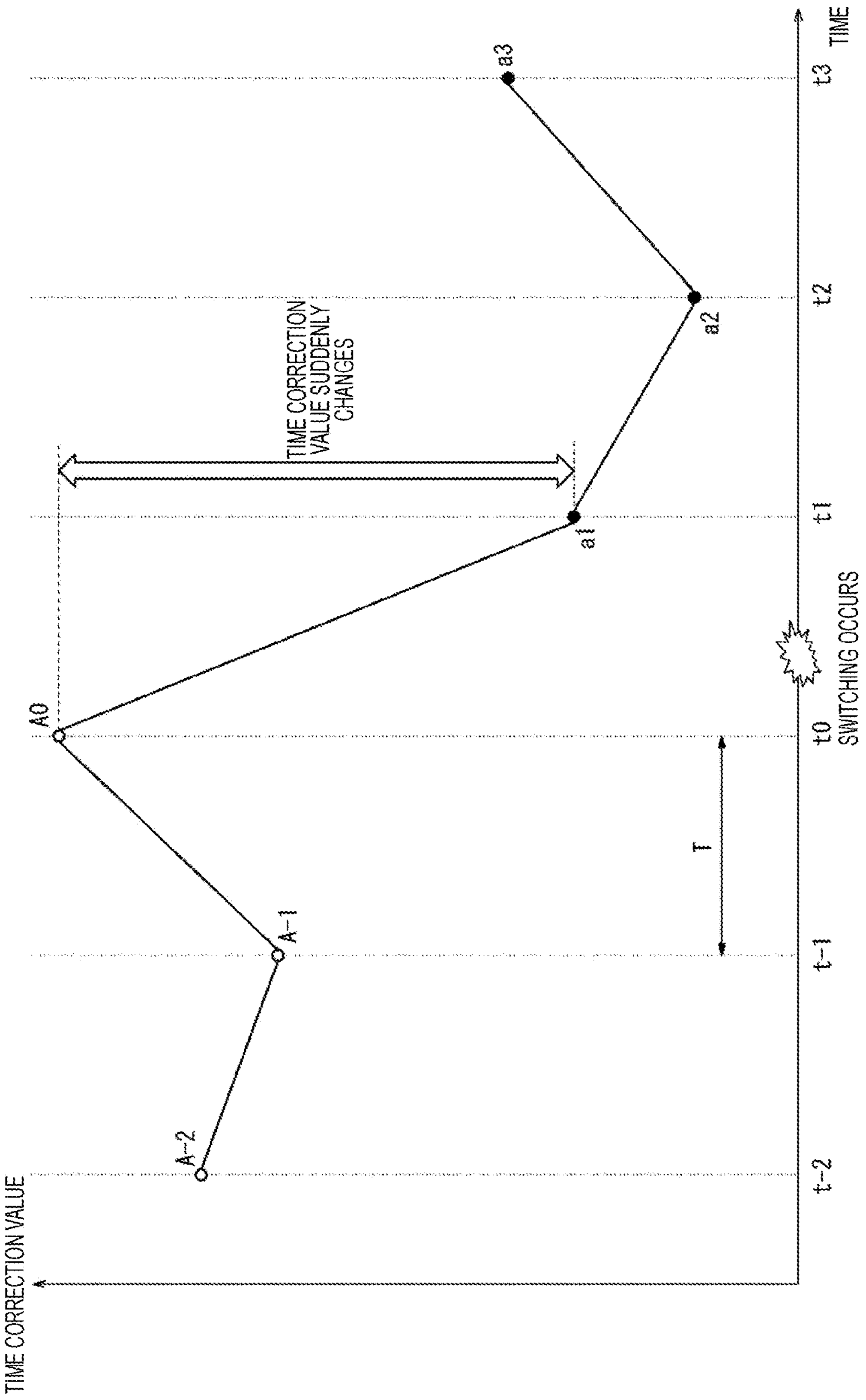
FIG. 8 is an explanatory diagram of a change in a time correction value caused by switching of a master device in the BC device of FIG. 7.

Next, adjustment of the time correction value by the correction value adjustment unit 19 will be described with reference to FIG. 3. In FIG. 3, as well as in FIG. 8, the master device 1 that synchronizes time with the BC device 10 is switched between a time to and a time t1. Further, hereinafter, time correction values for the switching source master device 1 at times t−2, t−1, and to are represented by A-2, A-1, and A 0, respectively, and time correction values for the switching destination master device 1 at times t1, t2, and t3 are represented by a1, a2, and a3, respectively.

When the master device 1 that synchronizes time with the BC device 10 is switched between the time to and the time t1, the correction value calculation unit 17 calculates a time correction value for the switching destination master device 1 at the time t1. As described above, the time correction value for the switching destination master device 1 at the time t1 is a1.

The correction value adjustment unit 19 adjusts the time correction value a1 calculated by the correction value calculation unit 17 on the basis of a previous time correction value used for adjusting the internal time and stored in the correction value storage unit 18. The correction value storage unit 18 stores the time correction value A0 used for correcting the internal time at the time to immediately before the time t1. Therefore, the correction value adjustment unit 19 adjusts the time correction value a1 on the basis of the time correction value A0.

Here, the correction value adjustment unit 19 adjusts the time correction value a1 such that a difference between the time correction value a1 and the adjusted time correction value is smaller than a difference between the time correction value a1 and the time correction value A0. That is, the correction value adjustment unit 19 adjusts the time correction value for the switching destination master device 1 such that a difference between the time correction value for the switching destination master device 1 and the adjusted time correction value is smaller than a difference between the time correction value for the switching destination master device 1 and the previous time correction value used for adjusting the internal time. For example, the correction value adjustment unit 19 calculates an average (A0+a1)/2 of the time correction value A0 and the time correction value a1 as an adjusted time correction value a1' at the time t1. Then, the correction value adjustment unit 19 adjusts the internal time on the basis of the calculated adjusted time correction value a1'. Further, the correction value adjustment unit 19 stores, in the correction value storage unit 18, the adjusted time correction value a1' used for adjusting the internal time.

Similarly, at the time t2, the correction value calculation unit 17 calculates the time correction value a2 for the switching destination master device 1. The correction value adjustment unit 19 corrects the time correction value a2 calculated by the correction value calculation unit 17 on the basis of the time correction value a1' stored in the correction value storage unit 18. For example, the correction value adjustment unit 19 calculates an average (a1'+a2)/2 of the time correction value a2 and the time correction value a1' as an adjusted time correction value a2' at the time t2.

An example where the time correction value calculated by the correction value calculation unit 17 is adjusted by using the average of the time correction value calculated by the correction value calculation unit 17 and the time correction value stored in the correction value storage unit 18 has been described in FIG. 3. However, the present invention is not limited to this example. The correction value calculation unit 17 only needs to adjust the time correction value for the switching destination master device 1 such that the difference between the time correction value for the switching destination master device 1 and the adjusted time correction value is smaller than the difference between the time correction value for the switching destination master device 1 and the previous time correction value used for adjusting the internal time.

At the time t3, the correction value adjustment unit 19 ends the adjustment of the time correction value calculated by the correction value calculation unit 17 and adjusts the internal time on the basis of the calculated time correction value. That is, in a case where the master device 1 (one host device) that synchronizes time with the BC device 10 is switched, the correction value adjustment unit 19 corrects the internal time on the basis of the adjusted time correction value during a predetermined period of time and, after the predetermined period of time elapses, corrects the internal time on the basis of the time correction value calculated for the switching destination master device 1.

As described above, the BC device 10 serving as the time synchronization device according to the present embodiment includes the selection unit 16, the correction value calculation unit 17, the correction value storage unit 18, and the correction value adjustment unit 19. The selection unit 16 selects one host device that synchronizes the internal time of the BC device 10 from among a plurality of host devices (master devices 1). The correction value calculation unit 17 calculates a time correction value for correcting the internal time such that the one host device and the time synchronization device synchronize with each other. The correction value storage unit 18 stores a previous time correction value used for correcting the internal time. In a case where the one host device is switched, the correction value adjustment unit 19 adjusts a time correction value calculated for a switching destination host device on the basis of the time correction value stored in the correction value storage unit 18 and corrects the internal time on the basis of the adjusted time correction value.

A time synchronization method according to the present embodiment includes: a step of selecting one host device that synchronizes the internal time of the BC device 10 from among a plurality of host devices (master devices 1); a step of calculating a time correction value for correcting the internal time such that the one host device and the time synchronization device synchronize with each other; a step of storing a previous time correction value used for correcting the internal time; and a step of, in a case where the one host device is switched, adjusting a time correction value calculated for a switching destination host device on the basis of the stored time correction value and correcting the internal time on the basis of the adjusted time correction value.

In a case where the one host device that synchronizes the internal time of the BC device 10 is switched, the time correction value calculated for the switching destination host device is corrected on the basis of the previous time correction value used for correcting the internal time. This makes it possible to suppress a sudden change in the time correction value caused by switching of the host device. As a result, it is possible to reduce an influence on an operation of the slave device 2 serving as the subordinate device.

Next, a hardware configuration of the BC device 10 serving as the time synchronization device according to the present embodiment will be described.

Figure 4:
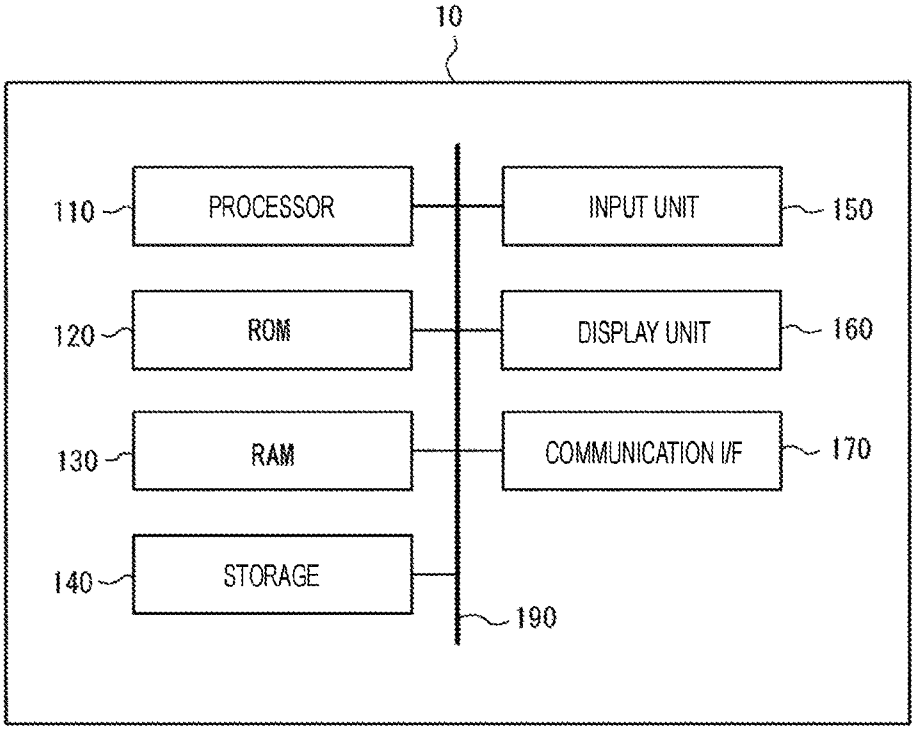
FIG. 4 illustrates an example of a hardware configuration of the BC device in FIG. 1.
Figure 5:
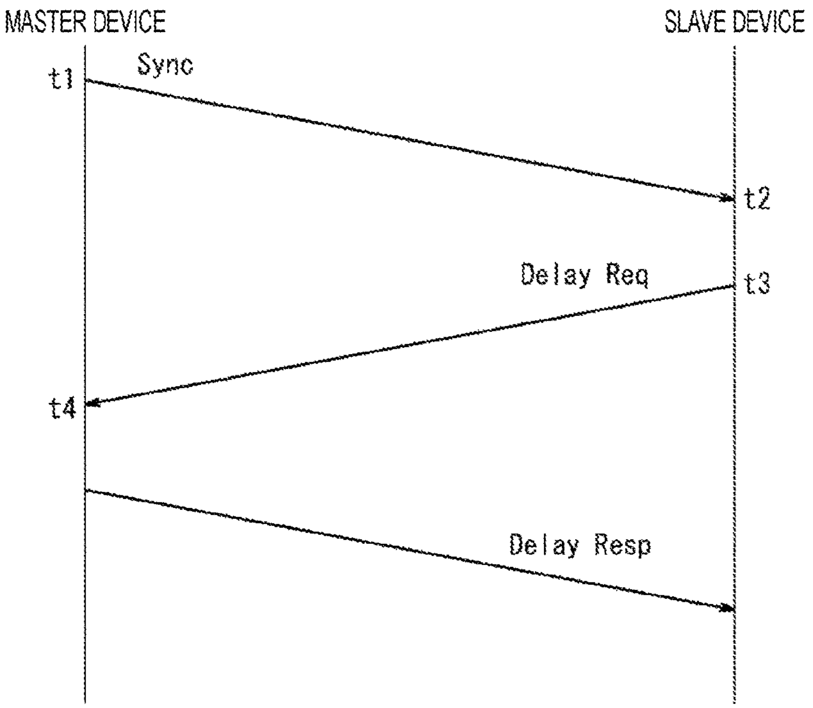
FIG. 5 is an explanatory diagram of time synchronization using the PTP.

FIG. 4 illustrates a hardware configuration of the BC device 10 according to the embodiment of the present disclosure. FIG. 4 illustrates an example of the hardware configuration of the BC device 10 in a case where the BC device 10 includes a computer capable of executing a program command. Here, the computer may be a general-purpose computer, a dedicated computer, a workstation, a personal computer (PC), an electronic notepad, or the like. The program command may be a program code, a code segment, or the like for executing required tasks.

As illustrated in FIG. 4, the BC device 10 includes a processor 110, a read only memory (ROM) 120, a random access memory (RAM) 130, a storage 140, an input unit 150, a display unit 160, and a communication interface (I/F) 170. The components are communicably connected to each other via a bus 190. Specifically, the processor 110 is a central processing unit (CPU), a micro processing unit (MPU), a graphics processing unit (GPU), a digital signal processor (DSP), a system on a chip (SoC), or the like and may be configured by the same or different types of a plurality of processors.

The processor 110 is a controller that executes control of the components of the BC device 10 and various types of arithmetic processing. That is, the processor 110 reads a program from the ROM 120 or the storage 140 and executes the program by using the RAM 130 as a working area. The processor 110 executes control of the above components and various types of arithmetic processing according to the program stored in the ROM 120 or the storage 140. In the present embodiment, the ROM 120 or the storage 140 stores a program for causing a computer to function as the BC device 10 according to the present disclosure. When the processor 110 reads and executes the program, the components of the BC device 10, for example, the timer 11, the transmitter 12, the frequency adjustment unit 13, the selection unit 16, the correction value calculation unit 17, and the correction value adjustment unit 19 are implemented.

The program may be provided in a form in which the program is stored in a non-transitory storage medium, such as a compact disk read only memory (CD-ROM), a digital versatile disk read only memory (DVD-ROM), or a universal serial bus (USB) memory. The program may be downloaded from an external device via a network.

The ROM 120 is a storage unit that stores various programs and various types of data. The RAM 130 is a storage unit that temporarily stores programs or data as a work area. The storage 140 is a storage unit that includes a hard disk drive (HDD) or a solid state drive (SSD) and stores various programs including an operating system and various types of data. For example, the RAM 130 or the storage 140 stores a previous time correction value used for correcting the internal time of the BC device 10. The input unit 150 includes a pointing device such as a mouse and a keyboard and is used to perform various inputs.

The display unit 160 is, for example, a liquid crystal display and displays various types of information. The display unit 160 may function as the input unit 150 by employing a touchscreen system.

The communication interface 170 is an interface for communicating with another device such as external devices (e.g. the master device 1 and the slave device 2) and uses, for example, a standard such as Ethernet (registered trademark), FDDI, or Wi-Fi (registered trademark).

A computer can be suitably used to function as each unit of the BC device 10 described above. Such a computer can be implemented by storing a program in which processing contents for implementing the function of each unit of the BC device 10 are written in a storage unit of the computer and causing a processor of the computer to read and execute the program. That is, the program can cause the computer to function as the BC device 10 described above. The program can also be recorded in a non-transitory recording medium. Further, the program can also be provided via a network.

Regarding the above embodiments, the following supplementary notes are further disclosed.

Supplementary Note 1

A time synchronization device that synchronizes an internal time with a time distributed from one host device among a plurality of host devices and synchronizes a subordinate device with the internal time, the time synchronization device including:

a controller; and a memory, wherein the controller selects the one host device from among the plurality of host devices, a correction value calculation unit that calculates a time correction value that is a correction value for correcting the internal time such that the one host device and the time synchronization device synchronize with each other, stores a previous time correction value used for correcting the internal time in the memory, and in a case where the one host device is switched, adjusts a time correction value calculated for a switching destination host device on the basis of the time correction value stored in the memory and corrects the internal time on the basis of the adjusted time correction value.

Supplementary Note 2

The time synchronization device according to supplementary note 1, in which the controller adjusts a frequency of transmitting time information based on the internal time to the subordinate device and transmits the time information to the subordinate device at the adjusted frequency, and adjusts the time correction value in a period of transmitting the time information.

Supplementary Note 3

The time synchronization device according to supplementary note 1, in which in a case where the one host device is switched, the controller corrects the internal time on the basis of the adjusted time correction value during a predetermined period of time and, after the predetermined period of time elapses, corrects the internal time on the basis of the time correction value calculated for the switching destination host device.

Supplementary Note 4

A time synchronization method of synchronizing an internal time with a time distributed from one host device among a plurality of host devices and synchronizing the internal time with a subordinate device, the time synchronization method including:

selecting the one host device from among the plurality of host devices;

calculating a time correction value that is a correction value for correcting the internal time such that the one host device and the time synchronization device synchronize with each other;

storing a previous time correction value used for correcting the internal time; and in a case where the one host device is switched, adjusting a time correction value calculated for a switching destination host device on the basis of the stored time correction value and correcting the internal time on the basis of the adjusted time correction value.

Supplementary Note 5

A non-transitory storage medium storing a program executable by a computer, the non-transitory storage medium storing a program that causes the computer to operate as the time synchronization device according to supplementary note 1.

The above-described embodiments have been described as representative examples, and it is apparent to those skilled in the art that many modifications and substitutions can be made within the spirit and scope of the present disclosure. Therefore, it should not be understood that the present invention is limited by the above-described embodiments, and various modifications or changes can be made without departing from the scope of the claims. For example, a plurality of configuration blocks illustrated in the configuration diagrams of the embodiments can be combined into one, or one configuration block can be divided.

REFERENCE SIGNS LIST

1 Master device (host device)
2 Slave device (subordinate device)
10 BC device (time synchronization device)
11 Timer
12 Transmitter
13 Frequency adjustment unit
14, 15 IF
16 Selection unit
17 Correction value calculation unit
18 Correction value storage unit
19 Correction value adjustment unit
110 Processor
120 ROM
130 RAM
140 Storage
150 Input unit
160 Display unit
170 Communication I/F
190 Path

The invention claimed is:

1. A time synchronization device for synchronizing an internal time of the time synchronization device with a time distributed from one host device among a plurality of host devices and for further synchronizing a subordinate device of the time synchronization device with the internal time, the time synchronization device comprises:

a processor configured to execute operations comprising:

selecting the one host device from among the plurality of host devices;

calculating a time correction value that is a correction value for correcting the internal time of the time synchronization device to synchronize the one host device and the time synchronization device synchronize with each other;

storing the time correction value used for correcting the internal time for synchronizing the one host device;

adjusting, in a case where the one host device is subsequently switched to another host device, a subsequent time correction value calculated for said another host device on the basis of the stored time correction value used previously for synchronizing the time synchronization device with the one host device; and correcting the internal time on the basis of the adjusted subsequent time correction value.

2. The time synchronization device according to claim 1, further comprising adjusting a frequency of transmitting time information based on the internal time to the subordinate device, wherein the calculating the time correction value further comprises adjusting the time correction value in a period of transmitting the time information; and transmitting the time information to the subordinate device at the adjusted frequency.

3. The time synchronization device according to claim 1, wherein in a case where the one host device is switched to said another host device, the adjusting further comprises correcting the internal time on the basis of the adjusted subsequent time correction value during a predetermined period of time, and after the predetermined period of time elapses, correcting the internal time on the basis of the time correction value calculated for the said another host device.

4. The time synchronization device according to claim 1, wherein the time synchronization device represents a Boundary Clock device for synchronizing the internal time of the time synchronization device according to at least in part Precision Time Protocol.

5. The time synchronization device according to claim 1, wherein the plurality of host devices operates according to Precision Time Protocol.

6. The time synchronization device according to claim 1, wherein the one host device is switched according to Best Master Clock Algorithm.

7. The time synchronization device according to claim 1, wherein the correcting the internal time on the basis of the adjusted subsequent time correction time suppresses a sudden change in the time correction value caused by the one host device being switched to said another host device.

8. A time synchronization method for synchronizing an internal time of a time synchronization device with a time distributed from one host device among a plurality of host devices and for further synchronizing the internal time with a subordinate device of the time synchronization device, the time synchronization method comprising:

selecting the one host device from among the plurality of host devices;

calculating a time correction value that is a correction value for correcting the internal time of the time synchronization device to synchronize the one host device and the time synchronization device synchronize with each other;

storing the time correction value used for correcting the internal time for synchronizing the one host device;

in a case where the one host device is subsequently switched to another host device, adjusting a subsequent time correction value calculated for said another host device on the basis of the stored time correction value; and correcting the internal time on the basis of the adjusted subsequent time correction value.

9. The time synchronization method according to claim 8, further comprising:

adjusting a frequency of transmitting time information based on the internal time to the subordinate device, wherein the calculating the time correction value further comprises adjusting the time correction value in a period of transmitting the time information; and transmitting the time information to the subordinate device at the adjusted frequency.

10. The time synchronization method according to claim 8, wherein in a case where the one host device is switched, the adjusting further comprises correcting the internal time on the basis of the adjusted subsequent time correction value during a predetermined period of time, and after the predetermined period of time elapses, correcting the internal time on the basis of the time correction value calculated for said another host device.

11. The time synchronization method according to claim 8, wherein the time synchronization device represents a Boundary Clock device for synchronizing the internal time according to at least in part Precision Time Protocol.

12. The time synchronization method according to claim 8, wherein the plurality of host devices operates according to Precision Time Protocol.

13. The time synchronization method according to claim 8, wherein the one host device is switched according to Best Master Clock Algorithm.

14. The time synchronization method according to claim 8, wherein the correcting the internal time on the basis of the adjusted subsequent time correction time suppresses a sudden change in the time correction value caused by the one host device being switched to said another host device.

15. A computer-readable non-transitory recording medium storing a computer-executable program instructions that when executed by a processor cause a computer system to execute operations comprising:

selecting, by a processor of a time synchronization device, a one host device of a plurality of host devices for synchronizing an internal time of the time synchronizing device with a time distributed from the one host device and for further synchronizing a subordinate device of the time synchronization device with the internal time;

calculating a time correction value that is a correction value for correcting the internal time of the time synchronization device to synchronize the one host device and the time synchronization device synchronize with each other;

storing the time correction value used for correcting the internal time for synchronizing the one host device;

adjusting, in a case where the one host device is subsequently switched to another host device, a subsequent time correction value calculated for said another host device on the basis of the stored time correction value used previously for synchronizing the time synchronization device with the one host device; and correcting the internal time on the basis of the adjusted subsequent time correction value.

16. The computer-readable non-transitory recording medium according to claim 15, the computer-executable program instructions when executed by the processor further cause the computer system to execute operations comprising:

adjusting a frequency of transmitting time information based on the internal time to the subordinate device, wherein the calculating the time correction value further comprises adjusting the time correction value in a period of transmitting the time information; and transmitting the time information to the subordinate device at the adjusted frequency.

17. The computer-readable non-transitory recording medium according to claim 15, wherein in a case where the one host device is switched, the adjusting further comprises correcting the internal time on the basis of the adjusted subsequent time correction value during a predetermined period of time, and after the predetermined period of time elapses, correcting the internal time on the basis of the time correction value calculated for said another host device.

18. The computer-readable non-transitory recording medium according to claim 15, wherein the time synchronization device represents a Boundary Clock device for synchronizing the internal time according to at least in part Precision Time Protocol, and wherein the plurality of host devices operates according to Precision Time Protocol.

19. The computer-readable non-transitory recording medium according to claim 15, wherein the one host device is switched according to Best Master Clock Algorithm.

20. The computer-readable non-transitory recording medium according to claim 15, wherein the correcting the internal time on the basis of the adjusted subsequent time correction time suppresses a sudden change in the time correction value caused by the one host device being switched to said another destination host device.

* * * * *